United States Patent
Nishizawa (12)

(10) Patent No.: US 6,680,981 B1
(45) Date of Patent: Jan. 20, 2004

(54) π/4 SHIFT QPSK MODULATOR AND COMMUNICATION DEVICE

(75) Inventor: Masaharu Nishizawa, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/501,369

(22) Filed: Feb. 11, 2000

(30) Foreign Application Priority Data

Feb. 12, 1999 (JP) ............................................ 11-033876

(51) Int. Cl.[7] .................. H04L 27/20; H04L 5/12; H03C 1/00
(52) U.S. Cl. .................. 375/308; 375/261; 375/269; 332/103
(58) Field of Search .................. 375/239, 279, 375/329, 308; 332/103; 329/307

(56) References Cited

U.S. PATENT DOCUMENTS

| 5,361,047 | A | * | 11/1994 | Takahara et al. ............ 332/103 |
| 5,534,828 | A | * | 7/1996 | Okada et al. ............... 332/103 |
| 5,590,155 | A | * | 12/1996 | Yasuda ....................... 375/261 |
| 5,930,299 | A | * | 7/1999 | Vannatta et al. ............ 375/269 |

FOREIGN PATENT DOCUMENTS

| JP | A53247632 | 3/1978 |
| JP | A3235553 | 10/1991 |
| JP | A750693 | 2/1995 |

* cited by examiner

Primary Examiner—Stephen Chin
Assistant Examiner—Edith Chang
(74) Attorney, Agent, or Firm—Birch, Stewart, Kolasch & Birch, LLP

(57) ABSTRACT

The invention provides a π/4 shift QPSK modulator, as well as a communication device, which is capable of reducing the storage capacity of ROM for previously storing impulse response data, and which allows the power consumption to be lowered and the circuit scale to be downsized. In an impulse response storage section within an impulse response computing circuit, storage capacity for impulse response data is halved by using, in common, impulse response data of a one-side waveform of an impulse response waveform bilaterally symmetrical with respect to a peak value. Also, a read address signal is switched over by an address inversion section of a simple constitution so that blocks of two kinds of magnitudes, "1" and "1/√2", of the impulse response storage section are not accessed simultaneously.

6 Claims, 6 Drawing Sheets

π/4 SHIFT QPSK MODULATOR AND COMMUNICATION DEVICE

BACKGROUND OF THE INVENTION

The present invention relates to a π/4 shift QPSK modulator, as well as a communication device, which is suitable for use of ICs in communications using digital signals.

Conventionally, as a digital signal modulation system, the QPSK (Quadrature Phase Shift Keying) system has been widely used. In this QPSK system, a filter having roll-off characteristics is used as a band-limiting filter so that intersymbol interference is eliminated. This filter having roll-off characteristics is, in many cases, a digital filter because of complex characteristics. However, in this digital filter, since arithmetic processing of signals is executed by multiplications and additions, the arithmetic processing needs to be executed at high speed.

Thus, in order to keep up with this higher-speed arithmetic processing, there has been proposed a technique that the digital filter is replaced with ROM by previously storing processing results in ROM (Read Only Memory) and by feeding input data as ROM addresses (see Japanese Patent Laid-Open Publication SHO 53-24763).

There has also been proposed a symbol tap ROM division method that the digital-filter ROM is divided in every accumulative symbol tap ("π/4 QPSK Baseband Signal Generator Using Symbol Tap Divided ROM", Proceedings of the 1992 Spring Conference of IEICE (Institute of Electronics, Information and Communication Engineers)). The digital filter of this π/4 QPSK baseband signal generator using the symbol tap divided ROM, as shown in FIG. 6, comprises: nine unit delay circuits 61 for delaying 2-bit symbol mapping data in symbol cycles; totally nine ROMs 62 to which an address is given by totally 6 bits composed of 2-bit for output of each unit delay circuit 61 and 4-bit for time information; an adder 63 for adding up output data of the ROMs 62; and a D/A (digital-to-analog) converter 64 for converting output data of the adder 63 into analog form. The ROMs 62 are driven by a clock sixteen times higher than the symbol clock (oversampling). Data lengths of the nine ROMs 62 of the digital filter are 4, 5, 7, 10, 11, 10, 7, 5 and 4 bits, respectively, by simulating dynamic ranges of impulse response of the root Nyquist filter in every symbol interval.

Like this, by determining data lengths corresponding to necessary dynamic ranges in every symbol interval, the total capacity of the ROMs 62 is reduced without lowering the processing precision. Also, by time-dividing I and Q phases of the symbol mapping data, a π/4 shift QPSK baseband signal generator is implemented with one digital filter.

Further, a π/4 shift QPSK modulator in which circuit scale and ROM capacity are kept low is disclosed in Japanese Patent Laid-Open Publication HEI 3-235553. There has also been disclosed, in Japanese Patent Laid-Open Publication HEI 7-50693, a technique that in the π/4 shift QPSK modulator, ROM capacity is reduced by commonizing the phase information I, Q to the ROMs.

FIG. 5 is a main-part block diagram of the ROM capacity reducing technique by using a ROM in common to phase information I, Q, as described in Japanese Patent Laid-Open Publication HEI 7-50693. In FIG. 5 are shown a mapping circuit 50, an oversampling counter 51, an impulse response computing circuit 52, cumulating circuits 551, 552, and D/A converters 571, 572. The impulse response computing circuit 52 has therein a ROM 54 in which impulse response data of two kinds of phase information are stored, sign inverting circuits 526, 526 for performing sign inversion of impulse response data derived from the ROM 54, and zero output circuits 527, 527 for replacing outputs of the sign inverting circuits 526, 526 with zeroes. Since the ROM 54 is provided in common to two systems of phase information (I and Q components) perpendicular to each other, only one ROM 54 will do for phase information (I and Q components) and the storage capacity of the ROM 54 can be reduced.

Further, it is conceivable to make up a π/4 shift QPSK modulator shown in FIG. 4 by combining the prior arts of FIG. 5 and FIG. 6 as described above.

As shown in FIG. 4, a signal representing phase information outputted from a mapping circuit 10 is inputted to impulse response computing means 42. The inputted data is shifted with a shift register 421 by a symbol clock 13. Then, as shown in a signal arrangement view of FIG. 2, signal modulation is done by shifting a reference phase by π/4 in every symbol cycle. Referring to FIG. 2, a signal of a point • is transmitted at an even-numbered timing, and a signal of a point o is transmitted at an odd-numbered timing. That is, a phase state "o" becomes a phase state "•" with a shift of π/4 at the next symbol timing. Also, after phase information is differentially coded at each • and o, the phase information is divided into vectors of I component and Q component at the individual points • and o, and based on these pieces of information, mapped into magnitude information, sign information and zero replacement information by the mapping circuit 10. Then, symbol mapping data from the mapping circuit 10 is inputted to the shift register 421 (7 taps), and a total sum of impulse response values corresponding to signals representing the phase information time-delayed by the shift register 421 is computed, by which filter characteristics are fulfilled. Further, outputs from the registers D1–D7 of the shift register 421 are inputted to impulse response storage sections 424 (ROM1–ROM7), respectively, in which impulse response data have been dividedly stored. In these impulse response storage sections 424, an impulse response waveform (shown in the schematic view of FIG. 4) is divided into 7 symbol intervals, and impulse response data corresponding to a magnitude α and a magnitude β are oversampled in each symbol interval and stored into the ROM1–ROM7. Output values from an oversampling counter 11 of FIG. 4 correspond to sample numbers of FIG. 3, and impulse response data corresponding to the sample numbers are stored in the impulse response storage sections 424.

FIG. 3 shows impulse response data (amplitude values of impulse response waveform) stored in a ROM2 of the π/4 shift QPSK modulator shown in FIG. 4. Referring to FIG. 3, according to the sample numbers 1–16 and the magnitude information derived from the registers D1–D7 of the shift register 421, impulse response data is read from the ROM2, and the impulse response data read from the ROM2 is inputted to a numerical value conversion section 426 corresponding to the ROM2. Also, sign information and zero-replacement information contained in a signal representing phase information derived from the shift register 421 are time-divided by an IQ time-division clock 14 by a selector 425 and inputted to the numerical value conversion section 426. This numerical value conversion section 426 executes, as appropriate, sign inversion or zero replacement for each of phase information I and phase information Q with respect to the impulse response data derived from the ROM2. Then, outputs from all the numerical value conversion sections 426 are added up by an adder 15, separated into I component and Q component by latch circuits 161, 162, and the separated I component and Q component are converted into analog form by D/A converters 171, 172. Thus, modulation signals of I output and Q output are produced, respectively.

In the π/4 shift QPSK modulator shown in FIG. 4, which is based on a system that the principle of convoluting operation is applied to ROM filter implementation, a ROM data map is provided by partitioning a single-pulse root Nyquist filter pass waveform in every symbol interval, and by sampling the partitioned waveforms at an appropriate oversampling frequency, thus giving rise to a need for two kinds of magnitudes of impulse response data for the phase information of symbol intervals. As shown in FIG. 3, since a single-pulse root Nyquist filter pass waveform is bilaterally symmetrical with respect to a peak value, ROM data can be compressed to ½ by virtue of this characteristic.

However, in this π/4 shift QPSK modulator, only by cutting down the root Nyquist filter pass waveform to a one-side half, two phase-information read address signals would make access to the ROMs simultaneously, necessitating such a countermeasure as doubling the reading rate from the ROMs, which would cause disadvantages in terms of power consumption and the like. There is a further problem, in addition to such problems, that the circuit would be complicated due to the concurrent timing for read address signal switching and convoluting operations.

Therefore, an object of the present invention is to provide a π/4 shift QPSK modulator, as well as a communication device, which is capable of reducing the storage capacity of ROMs for previously storing impulse response data, and which allows power consumption to be—lowered and circuit scale to be downsized.

In order to achieve the above object, the present invention provides a π/4 shift QPSK modulator comprising: phase information computing means for computing a QPSK modulation signal according to an input signal, and outputting a signal representing phase information of the modulation signal; impulse response computing means for computing and outputting impulse response data corresponding to a signal representing the phase information derived from the phase information computing means; and impulse response cumulating means for cumulating the impulse response data derived from the impulse response computing means, and outputting the modulation signal based on a result of the cumulation, wherein the impulse response computing means comprises: shift registers of an even number of stages for delaying signals representing the phase information derived from the phase information computing means one after another in every symbol cycle; a plurality of impulse response storage sections for previously storing the rein divided impulse response data in every symbol interval, the divided impulse response data being obtained through steps of determining impulse response data by oversampling a one-side waveform of a bilaterally symmetrical impulse response waveform corresponding to a magnitude "1" of I component and Q component of the phase information, and a one-side waveform of a bilaterally symmetrical impulse response waveform corresponding to a magnitude "1/√2" of I component and Q component of a signal representing the phase information, respectively, based on a clock having a cycle which is a multiple of the symbol cycle, and dividing the individual impulse response data in to symbol intervals which counts a half of the number of stages of the shift registers; a read address control section for outputting a read address signal to each of the impulse response storage sections so that for a symbol interval of impulse response data that has been stored in the impulse response storage sections, impulse response data of the symbol interval is read out in a forward direction, while for a symbol interval of impulse response data that has not been stored in the impulse response storage sections, impulse response data of a symbol interval that is bilaterally symmetrical with the symbol interval is read out in a reverse order, based on the magnitude "1" or "1/√2" of I component and Q component of signals representing phase information of the stages delayed by the shift registers; and a numerical value conversion section for performing sign inversion and zero replacement of impulse response data read out from the impulse response storage sections according to signals representing phase information of the stages delayed by the shift registers.

According to the π/4 shift QPSK modulator of the present invention, the phase information computing means computes a QPSK modulation signal according to an input signal, and outputs a signal representing phase information of the modulation signal, and the shift registers of an even number of stages of the impulse response computing means delay signals representing the phase information one after another in every symbol cycle. Based on the magnitude "1" or "1/√2" of I component and Q component of signals representing phase information of the stages delayed by the shift registers, the read address control section outputs a read address signal to each of the impulse response storage sections so that for a symbol interval of impulse response data that has been stored in the impulse response storage sections, impulse response data of the symbol interval is read out in a forward direction, while for a symbol interval of impulse response data that has not been stored in the impulse response storage sections, impulse response data of a symbol interval that is bilaterally symmetrical with the symbol interval is read out in a reverse order. Then, the impulse response storage sections each output impulse response data that have been divided in every symbol interval, which count a half of the number of the shift registers, and that have been previously stored, in correspondence to the magnitudes "1" and "1/√2" of I component and Q component of the phase information. The impulse response data read out from the impulse response storage sections are subjected to sign inversion and zero replacement processes by the numerical value conversion section according to signals representing phase information of the stages delayed by the shift registers. Then, the impulse response cumulating means cumulates the impulse response data derived from the impulse response computing means, and outputs the modulation signal based on a result of the cumulation.

Like this, in the impulse response storage sections of the impulse response computing means, impulse response data obtained by oversampling a one-side waveform of an impulse response waveform (a single-pulse root Nyquist filter pass waveform) bilaterally symmetrical with respect to a peak value is used in common according to a symbol tap ROM division method, which is a method for dividing ROM of a digital filter in every symbol interval. By making the data length of the commonized data in the impulse response storage section per symbol interval into a data length equivalent to a dynamic range necessary for each symbol interval, the storage capacity of the impulse response storage sections can be reduced. Also, the read address control section of a simple construction switches a read address signal so that the impulse response storage sections which have stored impulse response data corresponding to the two kinds of magnitudes "1" and "$1/\sqrt{2}$" in every commonized symbol interval are not accessed simultaneously. Therefore, the storage capacity of the impulse response storage sections for previously storing impulse response data therein can be reduced, and power consumption can be lowered and the circuit scale can be lessened.

Also, in an embodiment, the numerical value conversion section comprises: a zero replacement section for performing zero replacement of impulse response data corresponding to the magnitude "1" of I component and Q component of signals representing phase information of the stages delayed by the shift registers out of the impulse response data read out from the impulse response storage sections, based on a signal representing the phase information; and a sign inversion section for performing sign inversion of impulse response data corresponding to the magnitude "$1/\sqrt{2}$" of I component and Q component of signals representing phase information of the stages delayed by the shift registers out of the impulse response data read out from the impulse response storage sections, based on a signal representing the phase information.

According to the $\pi/4$ shift QPSK modulator of this embodiment, a signal representing the phase information contains not only I component and Q component magnitude information but also I component sign inversion information, I component zero-replacement information, Q component sign inversion information and Q component zero-replacement information. The zero replacement section of the numerical value conversion section performs zero replacement, when the zero replacement is necessary, based on the I component and Q component zero-replacement information contained in the signal representing the phase information, on impulse response data corresponding to the magnitude information "1" in I component and Q component of signals representing phase information of the stages delayed by the shift registers out of impulse response data read out from the impulse response storage sections. Also, the sign inversion section of the numerical value conversion section performs sign inversion, when sign inversion is necessary, based on I component and Q component sign inversion information contained in a signal representing the phase information, on impulse response data corresponding to the magnitude information "$1/\sqrt{2}$" in I component and Q component of signals representing phase information of the stages delayed by the shift registers, out of the impulse response data read from the impulse response storage sections. Therefore, sign inversion and zero replacement processes corresponding to two pieces of phase information derived from the shift registers can be implemented by one numerical value conversion section, so that the circuit scale can be further reduced.

In an embodiment, a communication device uses the above $\pi/4$ shift QPSK modulator.

According to the communication device of this embodiment, the storage capacity of ROM for previously storing impulse response data of the $\pi/4$ shift QPSK modulator can be reduced, and besides power consumption as well as circuit scale of the $\pi/4$ shift QPSK modulator can be reduced. Therefore, a communication device of smaller size and lower power consumption can be realized.

In an embodiment, a communication device uses the above $\pi/4$ shift QPSK modulator for a PHS (Personal Handy-phone System).

According to this embodiment, the storage capacity of ROM for previously storing impulse response data of the $\pi/4$ shift QPSK modulator can be reduced, and besides power consumption and circuit scale of the $\pi/4$ shift QPSK modulator can be lowered. Therefore, a communication device of further smaller size can be provided for PHS' which are in demands for smaller size, lighter weight and lower power consumption.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, a $\pi/4$ shift QPSK modulator and a communication device of the present invention are described in detail by embodiments thereof illustrated in the accompanying drawings.

Figure 1:
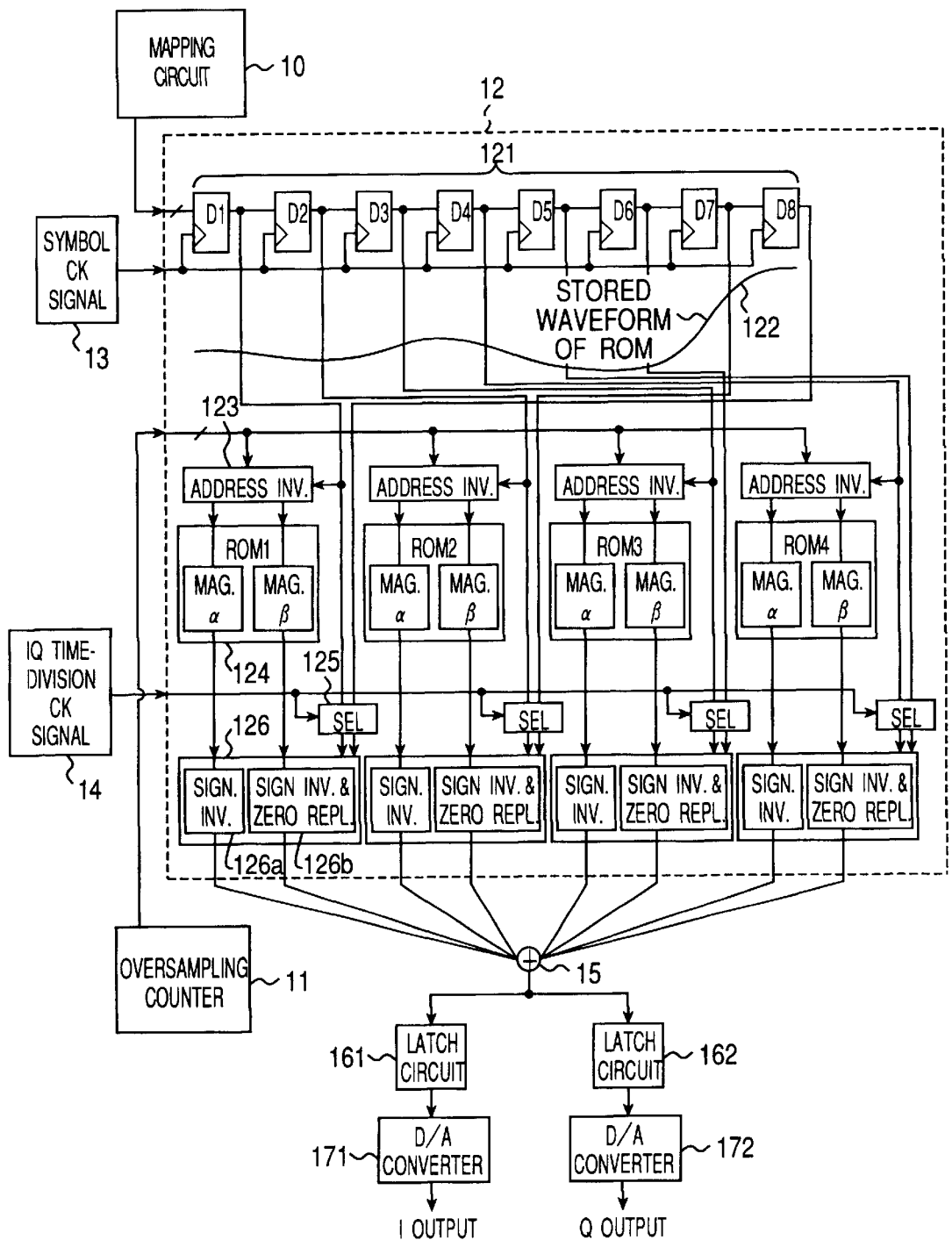
FIG. 1 is a main part block diagram of a $\pi/4$ shift QPSK modulator for PHS' as a communication device according to an embodiment of the present invention.

FIG. 1 is a main part block diagram of the π/4 shift QPSK modulator to be used for PHS' as a communication device according to an embodiment of the present invention.

As shown in FIG. 1, the π/4 shift QPSK modulator comprises: a mapping circuit 10 as phase information computing means for computing phase information of a modulation signal according to an input signal, and outputting a signal representing the phase information in every symbol cycle; an oversampling counter 11 for outputting a read address signal; an impulse response computing circuit 12 as impulse response computing means for, upon receiving a signal representing phase information derived from the mapping circuit 10, a read address signal derived from the oversampling counter 11 and an IQ time-division CK signal, outputting a plurality of impulse response values corresponding to the signal representing the phase information; an adder 15 for adding up the plurality of impulse response values outputted from the impulse response computing circuit 12; latch circuits 161, 162 for latching addition results derived from the adder 15; and D/A converters 171, 172 for converting output signals from the latch circuits 161, 162 from digital to analog form. The adder 15, the latch circuits 161, 162 and the D/A converters 171, 172 constitute impulse response cumulating means.

Also, the impulse response computing circuit 12 comprises a shift register 121 composed of eight registers D1–D8 for delaying signals derived from the mapping circuit 10 one after another in every symbol cycle based on a symbol CK signal; four address inversion sections 123 ("ADDRESS INV." in FIG. 1) as read address control sections for, upon receiving delayed signals representing phase information from the registers D1–D4 of the shift register 121 as well as a read address signal from the oversampling counter 11, outputting read address signals of two lines; impulse response storage sections 124 (ROM1–ROM4) for, upon receiving the read address signals of two lines from their respective address inversion sections 123, outputting signals representing amplitude values of impulse response waveform; four numerical value conversion sections 126 for, upon receiving signals representing amplitude values of impulse response waveform from the impulse response storage sections 124 (ROM1–ROM4), performing sign inversion by sign inversion sections 126a ("SIGN INV." in FIG. 1) and performing sign inversion and zero replacement by sign-inversion and zero-replacement sections 126b ("SIGN INV. & ZERO REPL." in FIG. 1); and four selectors 125 for, upon receiving delayed signals representing phase information from the registers D1, D8 (D2, D7; D3, D6; D4, D5) of the shift register 121 as well as an IQ time-division CK signal, time-dividing and outputting I-component and Q-component information of the signals representing the phase information to the numerical value conversion sections 126, respectively.

In addition, the signal representing phase information from the mapping circuit 10 has magnitude information of I component (and Q component) of phase information, I sign information representing the sign of I component, I zero-replacement information representing whether or not I component is zero, Q sign information representing the sign of Q component, and Q zero-replacement information representing whether or not Q component is zero. For example, as shown in the following Table 1,

TABLE 1

| Phase information | | Output signal of mapping circuit | | | | |
|---|---|---|---|---|---|---|
| I | Q | Magnitude info. | I Sign info. | I Zero replacement info. | Q Sign info. | Q Zero replacement info. |
| 1 | 0 | 1 | 0 | 0 | — | 1 |
| −1 | 0 | 1 | 1 | 0 | — | 1 |
| $1/\sqrt{2}$ | $1/\sqrt{2}$ | 0 | 0 | 0 | 0 | 0 |
| $1/\sqrt{2}$ | $-1/\sqrt{2}$ | 0 | 0 | 0 | 1 | 0 |
| $-1/\sqrt{2}$ | $1/\sqrt{2}$ | 0 | 1 | 0 | 0 | 0 |
| $-1/\sqrt{2}$ | $-1/\sqrt{2}$ | 0 | 1 | 0 | 1 | 0 |
| 0 | 1 | 1 | — | 1 | 0 | 0 |
| 0 | −1 | 1 | — | 1 | 1 | 0 | if I component of phase information is 1, −1 or 0, then its magnitude information is 1; and if the magnitude of I component of phase information is $1/\sqrt{2}$ or $-1/\sqrt{2}$, then its magnitude information is 0. Also, if the sign of I component of phase information is positive, then the I sign information is 0; and if the sign of I component of phase information is negative, then the I sign information is 1. Further, if I component of phase information is 1, −1, $1/\sqrt{2}$ or $-1/\sqrt{2}$, then the I zero-replacement information is 0; and if I component of phase information is 0, then the I zero-replacement information is 1. Likewise, Q sign information and Q zero-replacement information are also determined according to the Q component of phase information.

Figure 4:
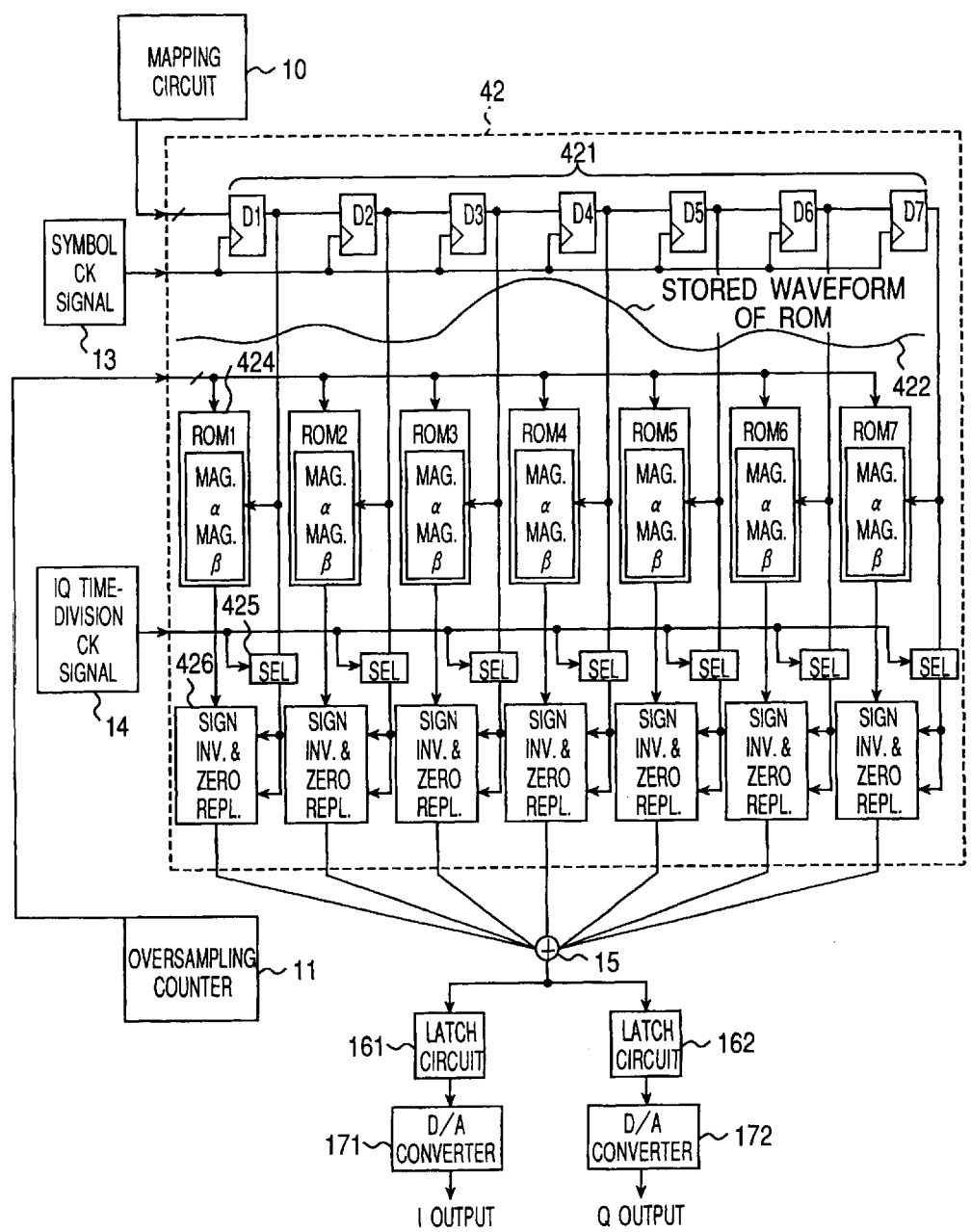
FIG. 4 is a block diagram of a $\pi/4$ shift QPSK modulator in combinations of prior arts.
Figure 5:
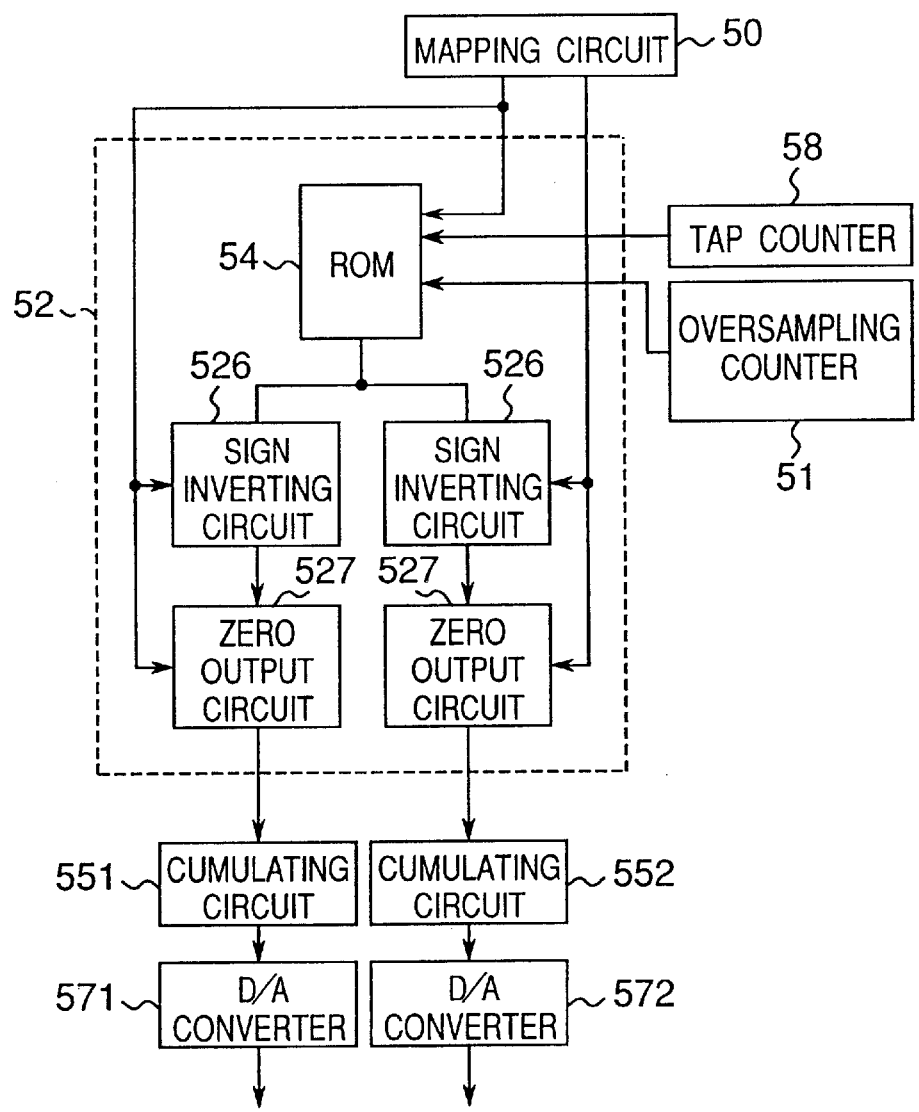
FIG. 5 is a main part configuration diagram of a $\pi/4$ shift QPSK modulator according to the prior art.
Figure 6:
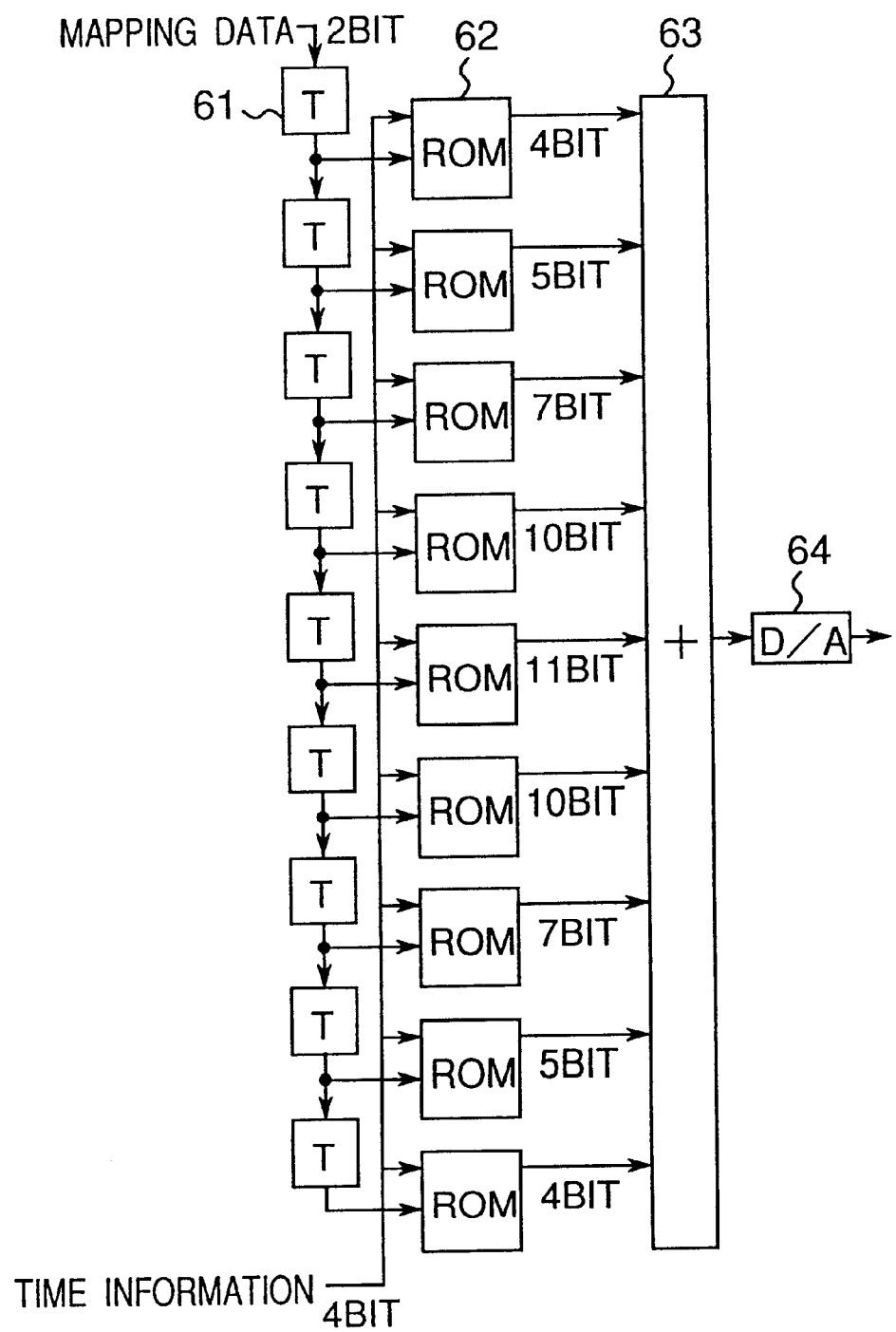
FIG. 6 is a configuration diagram of an impulse response computing circuit by the conventional symbol tap ROM division method.

Substantial differences of the π/4 shift QPSK modulator of this constitution from the π/4 shift QPSK modulator shown in FIG. 4 are that impulse response data 122 (shown in the schematic view of FIG. 1) in the impulse response storage sections 124 (ROM1–ROM4) is half of impulse response data 422 (shown in FIG. 4), and that one numerical value conversion section 126 is assigned to each of two symbol points of phase information. A further substantial difference is that an address signal from the oversampling counter 11 is non-inverted and inverted by the address inversion sections 123 and inputted to the impulse response storage sections 124.

Figure 3:
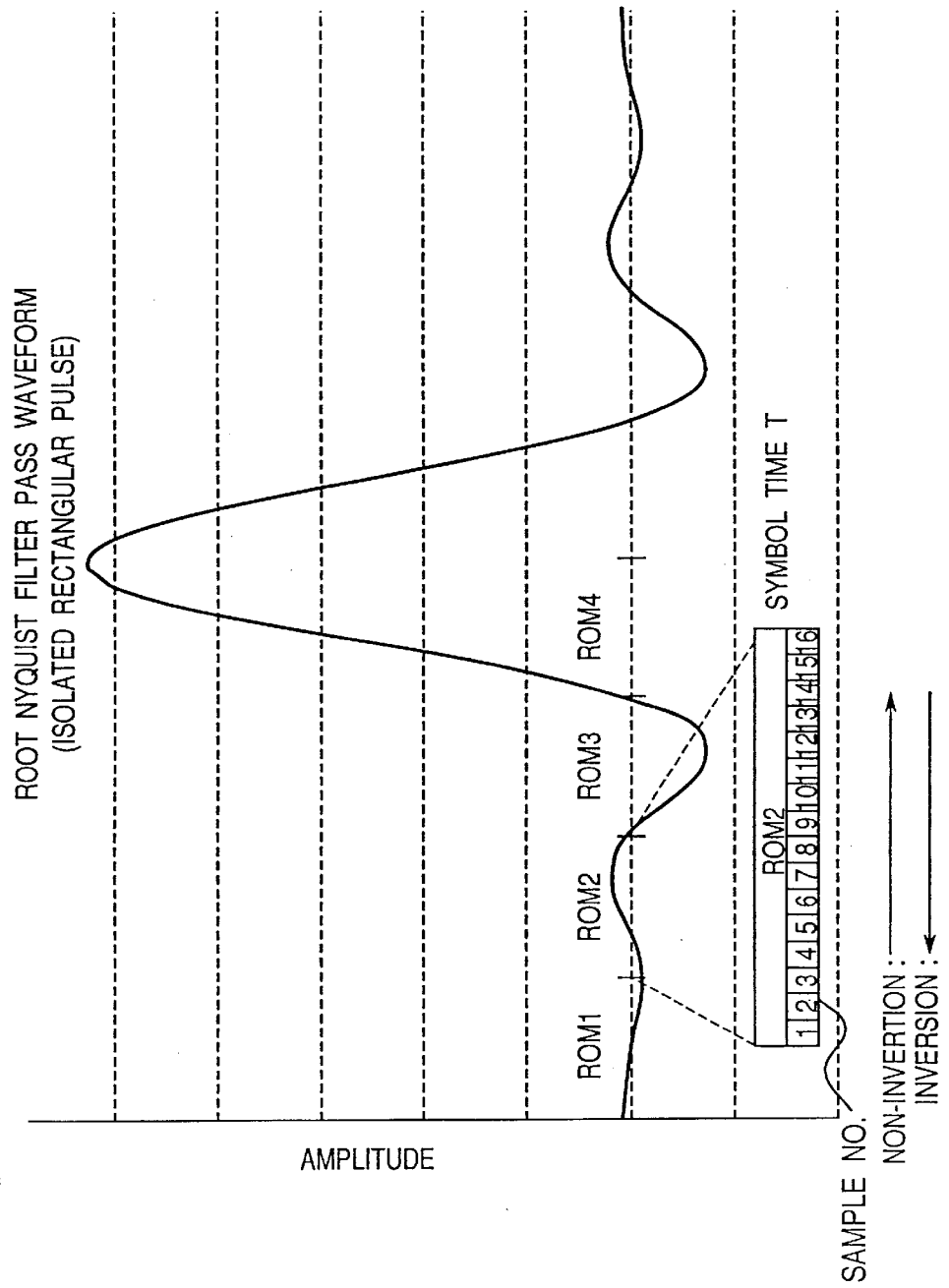
FIG. 3 shows an impulse response waveform as well as a sample number table of ROM.

FIG. 3 shows an impulse response waveform resulting when an isolated rectangular pulse passes a root Nyquist filter, where this impulse response waveform is bilaterally symmetrical with respect to a peak value. In the ROM1–ROM4 of FIG. 1, are stored amplitude values of the impulse response waveform corresponding to magnitude α (=$1/\sqrt{2}$) and magnitude β (="1") of the isolated rectangular pulse in the individual symbol intervals corresponding to the ROM1–ROM4 in FIG. 3.

For example, in the ROM2 of FIG. 3, are stored 32 (=16+16) amplitude values which are a sum of 16 amplitude values of the impulse response waveform corresponding to magnitude α oversampled in the order of sample numbers 1–16, and 16 amplitude values of the impulse response waveform corresponding to magnitude β. It is noted that data lengths of the ROM1–ROM4 are provided as data lengths corresponding to dynamic ranges necessary for the individual symbol intervals, by which the storage capacity is reduced. The shift register 121 has a structure of an even number of stages using eight registers D1–D8 for a rightand-left division with respect to the peak value of the root Nyquist filter pass waveform. For the impulse response waveform corresponding to outputs of the registers D5–D8 of the shift register 121, a read address signal of the oversampling counter 11 is inverted by the address inversion sections 123, so that the sample numbers are scanned and read in a reverse order of sample number 16 to sample number 1 within the ROM1–ROM4, thus allowing ROM outputs (amplitude values of the impulse response waveform) corresponding to the outputs of the registers D5–D8 to be obtained.

Figure 2:
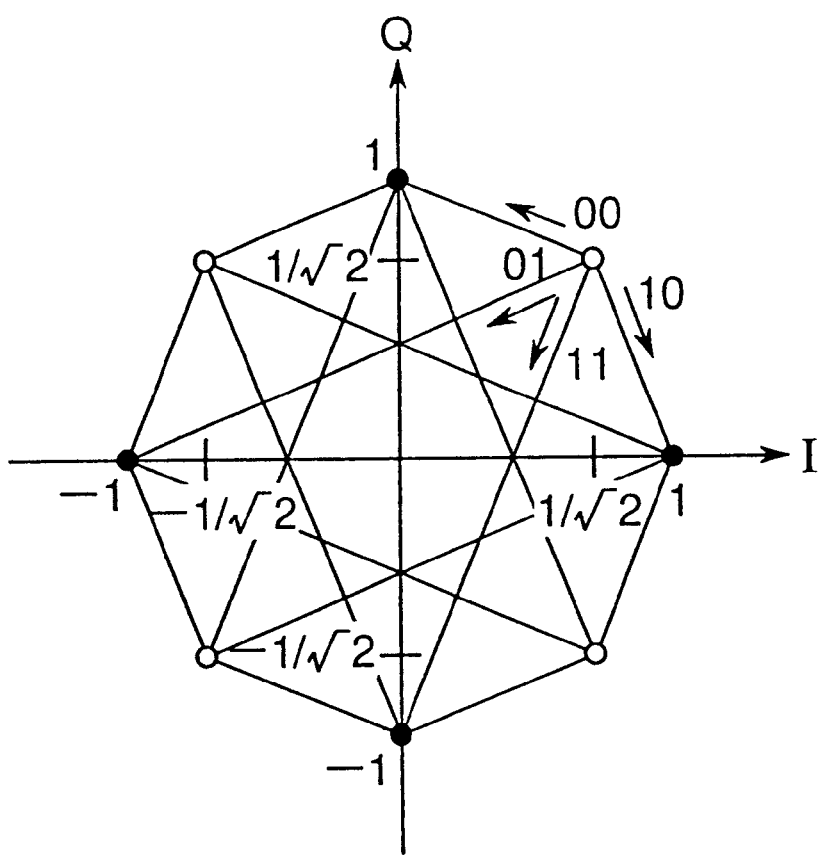
FIG. 2 is an arrangement diagram of IQ signals of a $\pi/4$ shift QPSK modulation signal in the $\pi/4$ shift QPSK modulator.

Also, with the read address signals non-inverted and inverted by the address inversion sections 123, according to the magnitude information of the registers D1–D4, magnitude α side blocks or magnitude β side blocks of the ROM1–ROM4 are accessed. Since o and • signals of FIG. 2 are transmitted at alternative timing as stated in the description of the prior art, magnitude information of output signals from the registers D1–D8 is selected as magnitude α and magnitude β, alternatively, so that non-inversion and the inversion are executed in the cycle of the symbol CK signal.

Therefore, for example in the ROM1, ROM data (amplitude values of impulse response waveform) corresponding to the symbol interval of the register D1 accords with the magnitude information derived from the register D1 as a result of a non-inverted address, while ROM data corresponding to the symbol interval of register D8 accords with the magnitude information derived from the register D8 as a result of an inverted address. This is based on the fact that the magnitude information of an output signal from the register D8 is necessarily reverse to the magnitude information of register D1 due to characteristics of the root Nyquist filter pass waveform shown in FIG. 3. Therefore, according to the magnitude information of the register D1, as can be understood from FIG. 2, a read address signal of the address inversion section 123 is assigned to the magnitude α (="1/√2") of ROM1 for a o signal, while an output of the address inversion section 123 is assigned to the magnitude β (="1") of ROM1 for a • signal. This is also the case with the address inversion sections 123 corresponding to the registers D2–D4. Then, impulse response values of magnitudes α, β are outputted from the ROM1–ROM4, respectively. As shown in FIG. 2, phase information I, Q takes the following eight sets of values:

as (I, Q) for a 0 signal of magnitude α:
 (1/√2, 1/√2)
 (1/√2, -1/√2)
 (-1/√2, 1/√2)
 (-1/√2, -1/√2)
and as (I, Q) for a • signal of magnitude β:
 (1, 0)
 (-1, 0)
 (0, 1)
 (0, -1)

Impulse response values corresponding to these kinds of phase information are obtained finally as I outputs and Q outputs.

In the above processes of the impulse response storage section 124 and the numerical value conversion section 126, for o signals, impulse response values for α=1/√2 read from the ROM1–ROM4 are outputted, depending on the signs of (I, Q). In other words, the impulse response values for α=1/√2 is left as they are in the case of positive I or Q, or subjected to inversion control by the sign inversion sections 126a in the case of negative I or Q so that the impulse response value becomes negative. More specifically, with reference to Table 1, given phase information (I, Q) of (1/√2, -1/√2), because I sign information is 0 and Q sign information is 1, the sign of the impulse response value for Q component is inverted so as to be negative. Also, given phase information (I, Q) of (-1/√2, 1/√2), because I sign information is 1 and Q sign information is 0, the sign of the impulse response value for I component is inverted so as to be negative. Further, given phase information (I, Q) of (-1/√2, -1/√2), because the I sign information is 1 and the Q sign information is 1, the signs of the impulse response values for I component and Q component are inverted so as to be negative.

For • signals, on the other hand, out of impulse response values for β (="1") read from the ROM1–ROM4, with respect to (I, Q), if I is 0, then the impulse response value is replaced with 0 by the sign-inversion and zero-replacement section 126b, and if Q is 0, then the impulse response value is replaced with 0 likewise by the sign-inversion and zero-replacement section 126b under control. More specifically, with reference to Table 1, given phase information (I, Q) of (1, 0) and (-1, 0), because the I zero-replacement information is 0 and the Q zero-replacement information is 1, the impulse response value for Q component is made to be 0. Also, given phase information (I, Q) of (0, 1) and (0, -1), because the I zero-replacement information is 1 and the Q zero-replacement information is 0, the impulse response value for I component is made to be 0.

Like this, since magnitude α="1/√2," and magnitude β="1", the o points in the signal arrangement of FIG. 2 can be defined as the magnitude α="1/√2" by sign processing, while the • points can be defined as the magnitude β="1" by sign processing and by the presence or absence of any zero replacement. Accordingly, it is reasonable to deliver outputs of the magnitude α side blocks of the impulse response storage sections 124 to the sign inversion sections 126a of the numerical value conversion sections 126, and to deliver outputs of the magnitude β side blocks of the impulse response storage sections 124 to the sign-inversion and zero-replacement sections 126b of the numerical value conversion sections 126. Thus, there is no need of any circuits or the like for switching depending on the phase information (I, Q).

Also, the IQ time-division CK signal is switched by the selectors 125 so that sign information and zero-replacement information of signals representing phase information derived from the registers D1–D8 of the shift register 121 are time-divided for each of I, Q components, as in the prior art. Thus, the sign information and the zero-replacement information contained in the signals representing phase information outputted from the registers D1–D8 of the shift register 121 are time-divided into I component and Q component by the selectors 125 in the following four combinations:

registers D1, D8;
registers D2, D7;

registers D3, D6; and registers D4, D5, and then the time-divided sign information and zero-replacement information contained in the signals representing phase information are processed by the individual numerical value conversion sections 126. In the numerical value conversion sections 126, when the magnitude α is selected according to the magnitude information of an output signal from the shift register 121, the signal is processed according to the sign information, while when the magnitude β is selected, the signal is processed according to the zero-replacement information. Then, after output signals from the numerical value conversion sections 126 are added up by the adder 15, signals representing addition results from the adder 15 are latched by the latch circuits 161, 162 in every I, Q component. The signals latched by the latch circuits 161, 162 in every I, Q component are converted from digital to analog form by the D/A converters 171, 172, by which modulation signals of I output and Q output are obtained.

Like this, by using one-side impulse response data of an impulse response waveform bilaterally symmetrical with respect to a peak value in common to impulse response data stored in the impulse response storage sections 124 of the impulse response computing circuit 12, the storage capacity for impulse response data can be reduced to one half. Also, since a read address signal is simply switched over by the address inversion sections 123 so that two kinds of impulse response data for the magnitudes "1" and "1/√2" of the impulse response storage sections 124 are not accessed simultaneously, the circuit scale can be reduced. Further, since two read address signals do not access the ROM1–ROM4 simultaneously, there is no need of increasing the reading rate of ROMs, thus allowing power consumption to be lowered.

Also, outputs from the magnitude α side blocks of the impulse response storage sections 124 are inputted to the sign inversion sections 126a of the numerical value conversion sections 126, and outputs from the magnitude β side blocks of the impulse response storage sections 124 are inputted to the sign-inversion and zero-replacement sections 126b of the numerical value conversion sections 126. Therefore, processing for two kinds of phase information is implemented by one numerical value conversion section 126 without using any circuit for switching depending on the phase information I, Q, thus allowing the circuit scale to be reduced.

Further, circuit data may be registered and utilized as an IP (Intellectual Property) core containing the π/4 shift QPSK modulator block of the above constitution. This IP core is, in a narrow sense, design data of functional blocks of electronic circuits that are necessitated in designing system LSIs (Large Scale Integrated circuits) or the like. This design data is exemplified by logic description data, RTL (Resistor-Transistor Logic circuit) level data, gate level data and the like, but, in a wide sense, middleware or the like is also included.

In designing today's large-scale system LSIs or the like, capabilities or specifications of system LSIs as well as equipment on which the system LSIs are mounted depend largely on what IP core is integrated, which also largely affects design time and reliability.

The π/4 shift QPSK modulator block of the present invention is one of functional blocks for modulation and demodulation in communication devices such as PHS'. This IP allows one-chip system LSIs particularly for communication equipment to be developed efficiently, when combined as a π/4 shift QPSK modulator block together with already developed other functional blocks (for example, channel CODEC (coder-decoder) other than modulation and demodulation, ADPCM (Adaptive Differential Pulse Code Modulation), data communication blocks or other functional blocks) or newly developed functional blocks.

It is also enabled to offer this IP core to manufacturers having different development environments, with the use of logic synthesis tools or library conversion tools made by Synopys Inc.

The foregoing embodiment has been described with respect to a PHS as a communication device. However, the communication device is not limited to this, and this invention can be applied to any communication device using a π/4 shift QPSK modulator.

The invention being thus described, it will be obvious that the same may be varied in many ways. Such variations are not be regarded as a departure from the sprit and scope of the invention, and all such modifications as would be obvious to one skilled in the art are intended to be included within the scope of the following claims.

What is claimed is:

1. A π/4 shift QPSK modulator comprising:

phase information computing means for computing a QPSK modulation signal according to an input signal, and outputting a signal representing phase information of the modulation signal;

impulse response computing means for computing and outputting impulse response data corresponding to a signal representing the phase information derived from the phase information computing means; and impulse response cumulating means for cumulating the impulse response data derived from the impulse response computing means, and outputting the modulation signal based on a result of the cumulation, wherein the impulse response computing means comprises:

shift registers of an even number of stages for delaying signals representing the phase information derived from the phase information computing means one after another in every symbol cycle;

a plurality of impulse response storage sections for previously storing therein divided impulse response data in every symbol interval, the divided impulse response data being obtained through steps of determining impulse response data by oversampling a one-side waveform of a bilaterally symmetrical impulse response waveform corresponding to a magnitude "1" of I component and Q component of a signal representing the phase information, and a one-side waveform of a bilaterally symmetrical impulse response waveform corresponding to a magnitude "1/√2" of I component and Q component of a signal representing the phase information, respectively, based on a clock having a cycle which is a multiple of the symbol cycle, and dividing the individual impulse response data into symbol intervals which counts a half of the number of stages of the shift registers;

a read address control section for outputting a read address signal to each of the impulse response storage sections so that for a symbol interval of impulse response data that has been stored in the impulse response storage sections, impulse response data of the symbol interval is read out in a forward direction, while for a symbol interval of impulse response data that has not been stored in the impulse response storage sections, impulse response data of a symbol interval that is bilaterally symmetrical with the symbol interval is read out in a reverse order, based on the magnitude "1" or "1/$\sqrt{2}$" of I component and Q component of signals representing phase information of the stages delayed by the shift registers; and a numerical value conversion section for performing sign inversion and zero replacement of impulse response data read out from the impulse response storage sections according to signals representing phase information of the stages delayed by the shift registers.

2. The π/4 shift QPSK modulator according to claim 1, wherein the numerical value conversion section comprises:

a zero replacement section for performing zero replacement of impulse response data corresponding to the magnitude "1" of I component and Q component of signals representing phase information of the stages delayed by the shift registers out of the impulse response data read out from the impulse response storage sections, based on a signal representing the phase information; and a sign inversion section for performing sign inversion of impulse response data corresponding to the magnitude "1/$\sqrt{2}$" of I component and Q component of signals representing phase information of the stages delayed by the shift registers out of the impulse response data read out from the impulse response storage sections, based on a signal representing the phase information.

3. A communication device which uses the π/4 Shift QPSK modulator as defined in claim 1.

4. A communication device which uses the π/4 Shift QPSK modulator as defined in claim 2.

5. A communication device which uses the π/4 shift QPSK modulator as defined in claim 1 for a Personal Handy-phone System (PHS).

6. A communication device which uses the π/4 shift QPSK modulator as defined in claim 2 for a Personal Handy-phone System (PHS).

* * * * *